United States Patent [19]

Levendis et al.

[11] Patent Number: 5,312,605
[45] Date of Patent: May 17, 1994

[54] METHOD FOR SIMULTANEOUSLY REMOVING SO$_2$ AND NO$_X$ POLLUTANTS FROM EXHAUST OF A COMBUSTION SYSTEM

[75] Inventors: Yiannis A. Levendis, Boston; Donald L. Wise, Belmont, both of Mass.

[73] Assignee: Northeastern University, Boston, Mass.

[21] Appl. No.: 805,012

[22] Filed: Dec. 11, 1991

[51] Int. Cl.$^5$ .............................................. B01D 47/00
[52] U.S. Cl. ...................... 423/210; 423/212; 423/213.2; 423/235; 423/635
[58] Field of Search ............ 423/212 C, 212 R, 213.2, 423/213.5, 635, 235, 210

[56] References Cited

U.S. PATENT DOCUMENTS

| | | | |
|---|---|---|---|
| 3,962,864 | 6/1976 | Williams et al. | 60/39.16 R |
| 4,001,384 | 1/1977 | Iwakura et al. | 423/551 |
| 4,154,399 | 5/1979 | Riano | 239/139 |
| 4,178,357 | 12/1979 | Stoddard et al. | 423/522 |
| 4,253,926 | 3/1981 | Laurie | 204/157.1 R |
| 4,297,321 | 10/1981 | Beranek | 422/143 |
| 4,299,192 | 11/1981 | Enga | 122/4 D |
| 4,302,425 | 11/1981 | Gamel | 422/161 |
| 4,304,550 | 12/1981 | Heian | 432/72 |
| 4,313,742 | 2/1982 | Ostlie | 55/241 |
| 4,323,371 | 4/1982 | Ritvanen | 55/19 |
| 4,381,718 | 5/1983 | Carver et al. | 110/347 |
| 4,389,323 | 6/1983 | Gancy | 252/70 |
| 4,419,331 | 12/1983 | Montalvo | 422/170 |
| 4,530,822 | 7/1985 | Ashley et al. | 423/242 |
| 4,545,879 | 10/1985 | Wan et al. | 204/158 R |
| 4,552,683 | 11/1985 | Powell et al. | 252/189 |
| 4,562,053 | 12/1985 | Andersson | 423/235 |
| 4,600,569 | 7/1986 | Yoon | 423/243 |
| 4,615,871 | 10/1986 | Yoon | 423/243 |
| 4,624,191 | 11/1986 | Zauderer et al. | 110/264 |
| 4,676,960 | 6/1987 | Keller et al. | 423/240 |
| 4,833,877 | 5/1989 | Ahland et al. | 60/39.02 |
| 4,861,577 | 8/1989 | Talonen et al. | 423/577 |
| 4,874,591 | 10/1989 | Jeney | 423/240 |
| 5,019,361 | 5/1991 | Hakka | 423/243 |
| 5,081,095 | 1/1992 | Bedford et al. | 502/304 |
| 5,116,584 | 5/1992 | Chen et al. | 423/235 |

FOREIGN PATENT DOCUMENTS

| | | | |
|---|---|---|---|
| 53-30975 | 3/1978 | Japan | 423/235 |
| 53-90168 | 8/1978 | Japan | 423/235 |
| 53-128023 | 11/1978 | Japan | 423/235 |

Primary Examiner—Gary P. Straub
Assistant Examiner—Timothy C. Vanoy
Attorney, Agent, or Firm—Weingarten, Schurgin, Gagnebin & Hayes

[57] ABSTRACT

A method is disclosed for removing pollutants from the exhaust of combustion systems burning fuels containing substantial amounts of sulfur and nitrogen. An exemplary method of the invention involves the formation and reaction of a sorbent comprising calcium magnesium acetate (CMA). The CMA is either dry-sprayed (in the form of a fine powder) or wet-sprayed in an aqueous solution in a high temperature environment such as a combustion chamber. The latter technique is feasible since CMA is a uniquely water-soluble form of calcium and magnesium. When the dispersed particles of CMA are heated to a high temperature, fine calcium and magnesium oxide particles, which are hollow with thin and highly porous walls are formed, affording optimum external and internal accessibility for reacting with toxic gaseous emissions such as SO$_2$. Further, the combustion of the organic acetate portion of the sorbent results in the conversion of NO$_x$ to N$_2$.

16 Claims, 4 Drawing Sheets

50μm

METHOD FOR SIMULTANEOUSLY REMOVING SO₂ AND NO_X POLLUTANTS FROM EXHAUST OF A COMBUSTION SYSTEM

Part of the work leading to this invention was carried out with funds provided by the United States Government as represented by the Department of Energy. Therefore, the U.S. Government has certain rights in this invention.

FIELD OF THE INVENTION

The present invention relates to the control of pollutant emissions, and more particularly to a method for controlling the pollutants of combustion systems.

BACKGROUND OF THE INVENTION

Techniques are known for controlling emissions of sulfur dioxide ($SO_2$) or nitrogen oxides ($NO_x$) which are toxic oxidation products emitted from combustion systems such as power plants.

Wet scrubbing towers permit effluent gases to pass through beds of limestone, dolomite, and other calcium-containing compounds or catalysts. U.S. Pat. Nos. 3,962,864; 4,178,357; 4,301,425; 4,304,550; 4,313,742; and 4,562,053 illustrate various devices for cleaning flue gases. Wet scrubbing devices tend to be expensive because their complexity requires high operating costs. They also suffer from severe corrosion and plugging problems.

The wet scrubbing process has constantly been modified in the attempt to down-size the scale of equipment. U.S. Pat. No. 4,861,577 describes a method wherein exhaust gas is absorbed into a scrubbing solution which is then treated in an autoclave to decompose such compounds as thiosulfate and polythionates into elemental sulfur and sulfate. U.S. Pat. No. 5,019,361 discloses an amine salt absorbent that purportedly permits high recovery of sulfur dioxide with smaller equipment.

A technique related to wet scrubbing is the spraying of water slurries or dry powders of sorbents. Various spraying devices, some of which are used in conjunction with wet scrubbers, are shown in U.S. Pat. Nos. 4,001,384; 4,323,371; 4,419,331; and 4,530,822. These facilitate gas/liquid contact by atomization of liquids into flue or stack gases. Injection of sorbents can be implemented in the furnace or post-furnace zone, depending upon the thermodynamic and kinetic processes involved, thereby increasing the flexibility of the spraying technique.

Sorbent particles, ideally, should be small in size, porous, and able to mix well with the gases that are to be cleaned of pollutants. Typical sorbents are listed below ("Alternative $SO_2$ Sorbents," PSI Technology Company Report PSI-538/TR-744, 1987. RESEARCH PARK. P.O. BOX 3100, Andover, Mass. 01810):

| Sorbent Class | Sorbent Type | Formula |
|---|---|---|
| Lime/Limestone | Hydrated Dolomite | $Ca(OH)_2.Mg(OH)_2$ |
| | Hydrated Lime | $Ca(OH)_2$ |
| | Limestone | $CaCO_3$ |
| | Dolomite | $CaCO_3.MgCO_3$ |
| Alkali | Trona | $Na_2CO_3.NaHCO_3.2H_2O$ |
| | Nahcolite | $NaHCO_3$ |
| Mixied Cation | Shortite | $Na_2Ca_2(CO_3)_3$ |
| | Gaylussite | $Na_2Ca(CO_3)_2.5H_2O$ |
| | Pirssonite | $Na_2Ca(CO_3)_2.H_2O$ |
| | Eitelite | $Na_2Mg(CO_3)_2$ |

Upon injection into high-temperature environments, sorbents containing calcium undergo calcination or decomposition to an oxide (CaO). The same holds true for magnesium-based sorbents which oxidize to MgO, as taught in U.S. Pat. No. 4,874,591. The internal surface area and porosity of sorbents increase drastically during calcination. However, at the higher temperatures, above 1000° C. for example, sintering occurs progressively, and the calcium oxide particles rapidly lose porosity and internal surface area.

Sulfation occurs subsequently to calcination. In other words, CaO reacts with $SO_2$ and $H_2S$ gases to form solid sulfate, sulfite or sulfide ($CaSO_4$, $CaSO_3$ or CaS). The extent of magnesium oxide reaction with $SO_2$ is not defined but is known to be much smaller than with calcium oxide. The role of MgO is believed to be in altering the pore structure of the sorbent to one that is more favorable for diffusion of $SO_2$ to the interior of the particle (Cole et al., Paper 16 Proceedings: 1986 Joint Symposium on Dry $SO_2$ and Simultaneous $SO_2/NO_x$ Control Technologies. 1, EPRI CS-4966, December 1986.) Furthermore, it has been reported that the presence of MgO promotes the catalytic oxidation of any existing $SO_3$ to $SO_2$. (Flagan, et al., *Fundamentals of Air-Pollution Engineering*. Prentice-Hall, New Jersey, 1988.) The reactions may potentially occur in the internal pore surface of the CaO particles as well as upon the external particle surface. However, because of the high molar volume of the calcium sulfate (3.3 times that of CaO) the reaction product induces pore filling and entrance closure in the sorbent particle. Hence, the outer layer reacts first to form calcium sulfate, the pores plug up, and the core remains unreacted. Although the sorbent particles may be ground to micron size to minimize this waste, such an adjustment step is prohibitively expensive for power plant applications and other large-scale uses.

SUMMARY OF THE INVENTION

The invention provides a method for controlling pollutant emissions from combustion systems. An exemplary method involves the formation and reaction of a sorbent comprising calcium magnesium acetate (CMA), which is traditionally used in deicing road salts. The CMA is either dry-sprayed (in the form of a fine powder) or wet-sprayed in an aqueous solution in a high temperature environment such as in a combustion or post-combustion zone of a furnace to provide fine particles necessary for reacting with hot gaseous sulfur/sulfur oxides and nitrogen oxides. Unlike calcium hydroxide, which is only slightly soluble in water, and calcium carbonate, which is not soluble in water, CMA may be completely dissolved in water in concentrations up to 30% by weight. Thus, in a preferred embodiment, a very fine mist of micron-sized droplets of CMA solution is sprayed into a coal combustion furnace where the water vaporizes and the organic acetate volatilizes and burns, reducing $NO_x$ to $N_2$.

The evaporation/combustion reactions result in the formation of popcorn-like particles made of calcium oxide (CaO) and magnesium oxide (MgO), which are hollow, or cenospheric, with thin and porous walls (wall porosities of approximately 75%). The as-formed particles are as small as or smaller than those obtained by conventional grinding techniques. Their walls contain micron-size blow-holes as well as meso- and micropores for optimum accessibility of the interior cavity to the gaseous sulfur compounds. As a result, the particles used in the method of the invention are highly efficient at binding sulfur compounds.

Wet spraying CMA in a furnace requires low capital and operating costs and facilitates the retrofitting of existing facilities. The highly porous, cenospheric nature of the lime (CaO) resulting from the calcination of CMA provides for accessibility of the sulfur bearing gases to the entire matrix of the particles, not only to their peripheries. Accordingly, the volume of wasted or unreacted sorbent is minimized. Among resulting advantages are lower sorbent purchasing expenses and lower expenses arising from sorbent (ash) treatment and landfilling costs.

Alternatively, dry-spraying of CMA powder also produces cenospheric CaO-MgO particles at high temperatures. Their walls are thin and porous, albeit a little less porous (65%) than those produced by dry-spraying. To minimize the waste of sorbent, this invention calls for low magnesium content CMA for use in coal combustion.

DESCRIPTION OF THE DRAWINGS

A complete understanding of the advantages and features of the invention can be more readily obtained by reference to the following detailed description when considered in conjunction with the accompanying drawings wherein.

DETAILED DESCRIPTION OF THE INVENTION

Figure 1:
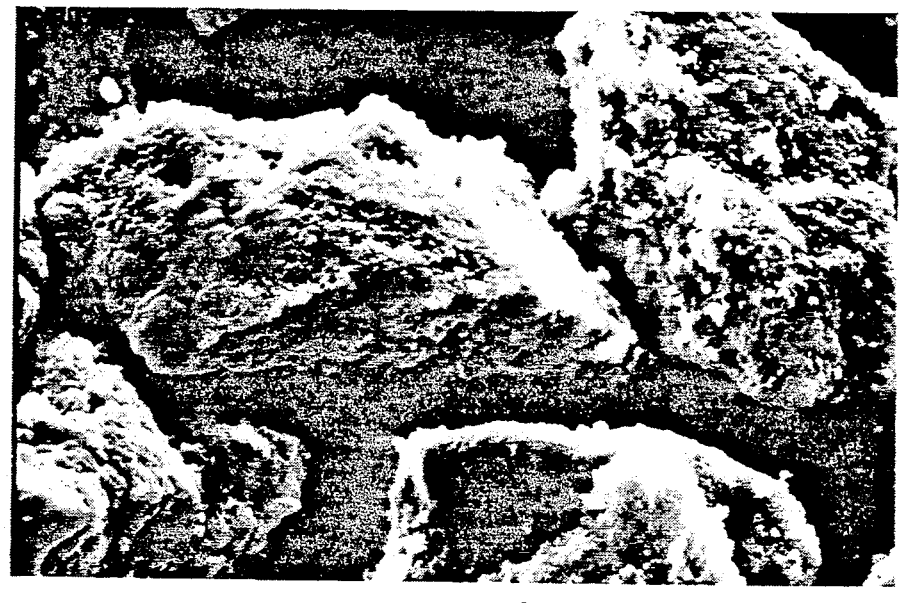
FIG. 1 is a photograph of particles obtained by grinding calcium magnesium acetate (CMA)

FIG. 1 shows a photograph of calcium magnesium acetate (CMA) in solid form. CMA is a water soluble form of calcium which can be dissolved in water in concentrations up to 30% by weight. In an aqueous solution, calcium magnesium acetate is believed to be dissociated as calcium ions ($Ca^{++}$), magnesium ions ($Mg^{++}$) and acetate ions ($CH_3COO^-$). When atomized and flash evaporated into a combustion zone, the calcium and magnesium oxidize, forming an aerosol of very finely dispersed particles ready for reaction with sulfur. The organic ligand, acetate, is burned to $CO_2$ and $H_2O$ and forms $N_2$ from $NO_x$.

Figure 2A:
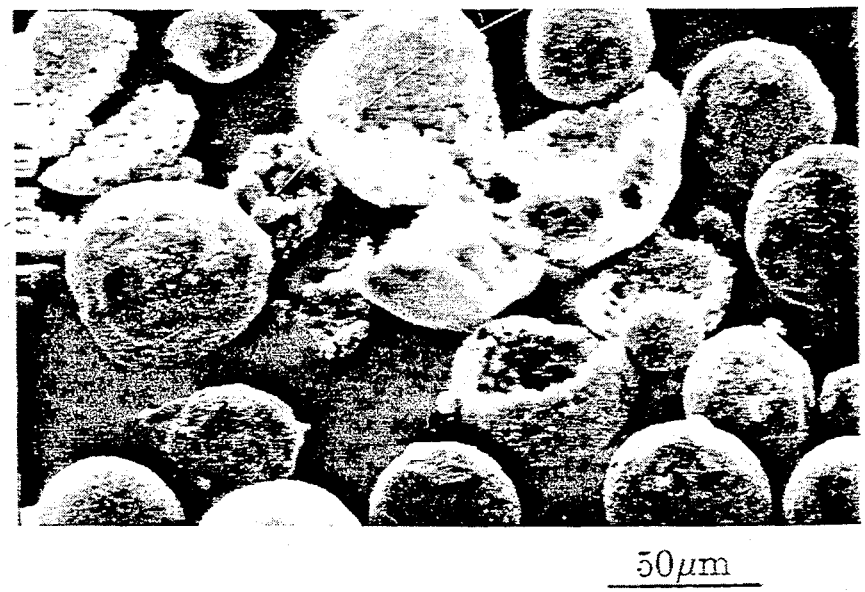
FIGS. 2a and 2b are photographs at different magnifications of calcium and magnesium oxide particles formed at 600° C. from spray drying an aqueous solution of CMA in a high temperature zone of a combustion chamber.
Figure 2B:

FIG. 2 is a photograph of the CaO-MgO particles formed by spray drying a solution of CMA in a high temperature zone. The particles are cenospheric, or hollow, with highly porous walls, having a porosity of 75% and a BET total internal and external surface area of 35 $m^2/g$. They contain large micron-size blowholes as well as meso-pores (0.01 $\mu m$) for providing the gaseous sulfur oxide maximum accessibility to internal as well as external reaction sites.

Although the mechanism of this evaporation/combustion reaction may be complex, it is clear that using a highly water soluble form of calcium to control sulfur and $NO_x$ has fundamental advantages. While calcium hydroxide ($Ca(OH)_2$) is only slightly soluble in water, and calcium carbonate ($CaCO_3$) is not water soluble, the highly water-soluble CMA may be forced in solution through a nozzle, atomizer, nebulizer, or other such dispersal device, and sprayed as a mist of micron-size particles into a high temperature zone. The zone may be in a combustion furnace or post-combustion zone of a coal burning power plant, an oil-fired furnace, an industrial furnace, an incinerator, and any other combustion system, including a diesel engine or other type of internal combustion engine.

Figure 3A:
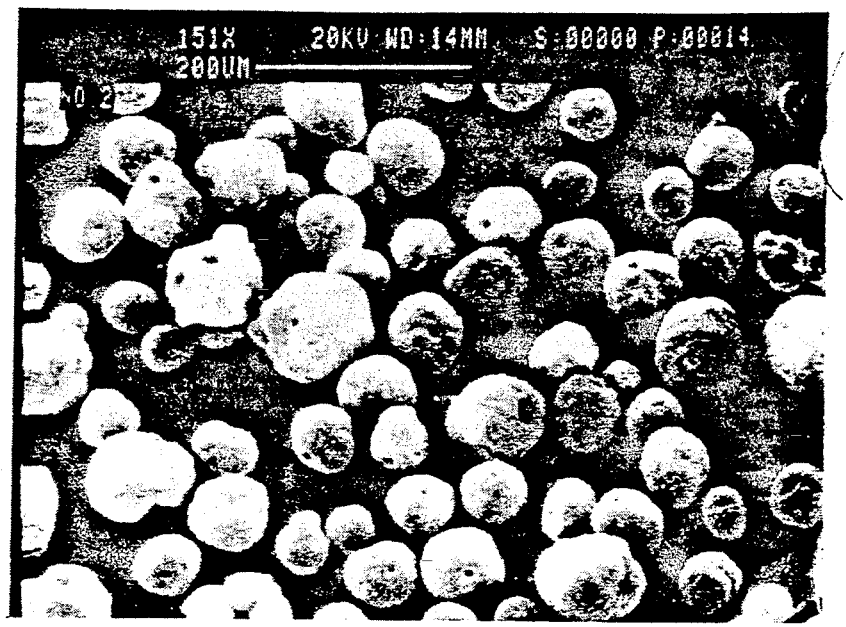
FIGS. 3a and 3b are photographs at different magnifications of calcium and magnesium oxide particles formed at 1200° C. from spraying a dry power of CMA in a high temperature zone of a combustion chamber.
Figure 3B:
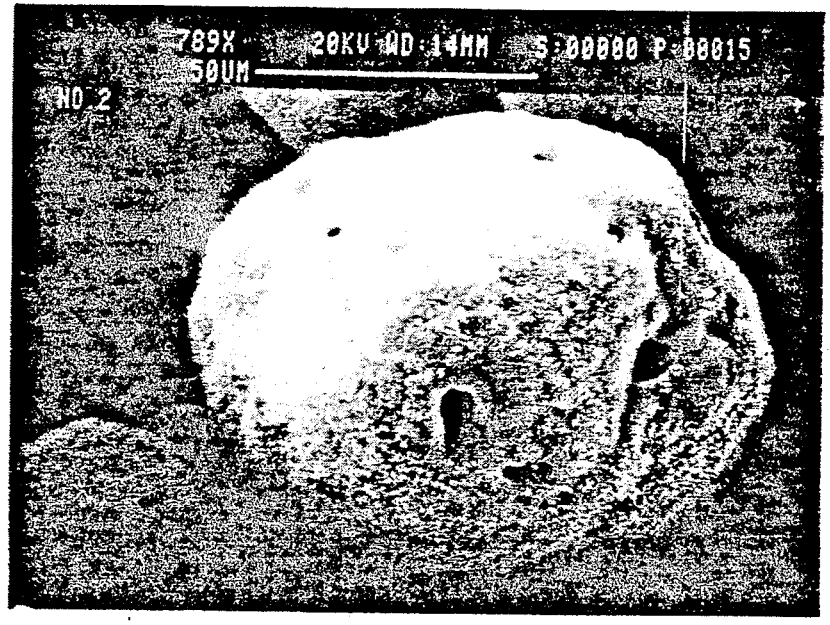

If desired, a dry powder of CMA can also be sprayed in the high temperature environment, and it will transform to similarly cenospheric CaO-MgO particles as the wet-sprayed solution, FIG. 3. The particle walls are a little less porous in this case.

Figure 4:
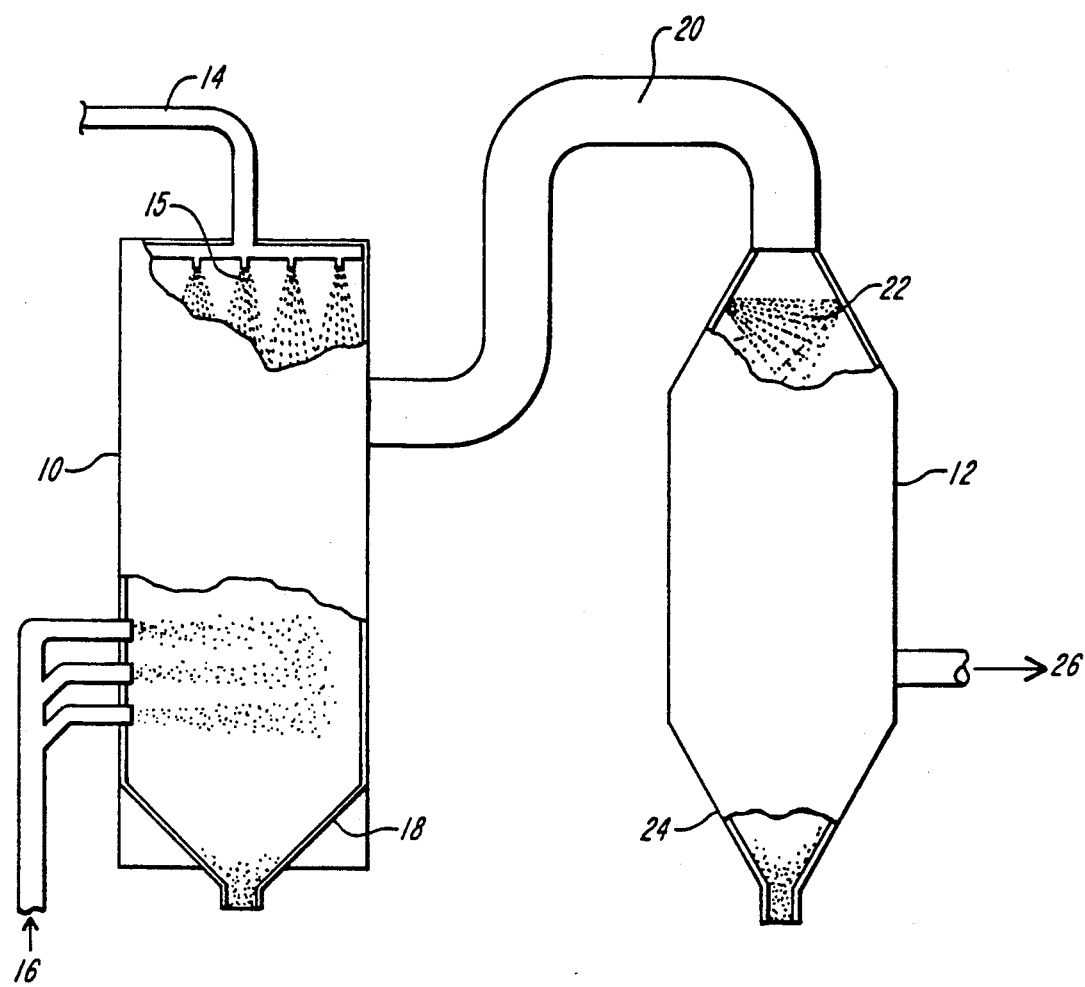
FIG. 4 is a schematic view of CMA being sprayed into a combustion chamber or post-combustion scrubber.

Referring to FIG. 4, in a typical furnace, consisting of a boiler 10 and attached scrubber 12, CMA is provided in the form of a fine mist of micron-sized droplets at the top of boiler 10, via wet spray injection line 14 and nozzles 15, while a pulverized coal flame is fed into the boiler via coal feed line 16. As the water in the sorbent solution vaporizes, the organic acetate volatilizes and burns, reacting with the nitrogen oxides. At the same time, as described, hollow, porous popcorn-like calcium oxide magnesium oxide particles are formed and react with the noxious sulfur gases. The reacted particles settle as ash into the ash hopper 18 at the base of the boiler while unreacted flue gases pass to scrubber 12 via flue pipe 20.

Alternatively, the flue gases are exposed to an atomized CMA solution via spray nozzles 22 in scrubber 12, ash is collected in the scrubber ash hopper 24, and the exiting flue gases are filtered in backhouse 26. Depending on the $SO_2$ concentrations, the scrubbing reactions may be more favorable at the cooler temperatures at the exit of the boiler.

The overall reaction mechanism is:

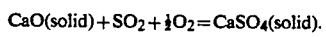

$$CaO(solid) + SO_2 + \tfrac{1}{2}O_2 = CaSO_4(solid).$$

As the temperature is increased, the reaction is thermodynamically less favorable but proceeds to completion at a faster rate.

Other sorbents are also useful in the method of the invention. Calcium acetate (CA) undergoes the same evaporation/combustion reactions as CMA upon calcination. In addition, the acetate salt of any cation, e.g. $Na^+$, that would be reactive as an oxide with gaseous compounds of sulfur can be used in the flue gas scrubbing method.

Other embodiments of the invention will be apparent to those skilled in the art from a consideration of this specification or practice of the invention disclosed herein. It is intended that the specification and the examples be considered as exemplary only, with the true scope and spirit of the invention being indicated by the following claims.

What is claimed is:

1. A method for simultaneously controlling $SO_2$ and $NO_x$ pollutant emissions from a combustion system, consisting essentially of the steps of:
   providing an acetate salt of a cation that forms an oxide reactive with gaseous compounds of sulfur; and
   spraying said acetate salt into a high temperature environment of a combustion system in the presence of gaseous compounds $SO_2$ and $NO_x$ pollutants resulting from combustion in said combustion system, the acetate anion of said salt volatilizing and reacting with the $NO_x$ pollutant and, simultaneously, cenospheric, porous particles of an oxide of said cation forming and reacting with the $SO_2$ pollutants.

2. The method of claim 1 wherein said acetate salt is sprayed into the high temperature environment of a combustion zone.

3. The method of claim 1 wherein said acetate salt is sprayed into the high temperature environment of a postcombustion zone.

4. The method of claim 1 wherein in said providing step said acetate salt is in the form of an aqueous solution of said salt.

5. The method of claim 1 wherein in said providing step said acetate salt comprises calcium as a cation.

6. The method of claim 5 wherein said acetate salt is, calcium magnesium acetate.

7. A method for simultaneously controlling $SO_2$ and $NO_x$ pollutant emissions from a combustion system, consisting essentially of the steps of:
   providing an aqueous solution of calcium magnesium acetate; and
   spraying said solution into a high temperature environment of a combustion system in the presence of gaseous compounds including $SO_2$ and $NO_x$ pollutants resulting from combustion in said combustion system, the acetate anion of said calcium magnesium acetate volatilizing and reacting with the $NO_x$ pollutant and, simultaneously, cenospheric, porous particles of calcium and magnesium oxide are formed and control $SO_2$ pollutant emissions.

8. The method of claim 7 wherein said solution is sprayed into the high temperature environment of a combustion zone.

9. The method of claim 7 wherein said solution is sprayed into the high temperature environment of a postcombustion zone.

10. The method of claim 7 wherein said spraying step further comprises the use of a nozzle.

11. The method of claim 7 wherein said as-formed particles are porous.

12. The method of claim 7 wherein said as-formed particles are hollow.

13. The method of claim 7 wherein said as-formed particles have a wall porosity of about 75% and a BET surface area of about 35 $m^2/g$.

14. The method of claim 7 wherein said high temperature environment is separate from a combustion zone which emits sulfur.

15. The method of claim 7 further comprising the step of accumulating and removing reaction products from said high temperature environment.

16. A method for simultaneously controlling $SO_2$ and $NO_x$ pollutant emissions from a combustion system, consisting essentially of the steps of:
   providing an aqueous solution of calcium magnesium acetate; and
   spraying said solution into the high-temperature postcombustion zone of an internal combustion engine system in the presence of gaseous compounds including $SO_2$ and $NO_x$ pollutants resulting from combustion in said internal combustion engine, the acetate anion of said calcium magnesium acetate volatilizing and reacting with the pollutant $NO_x$ and, simultaneously, cenospheric, porous particles of calcium and magnesium oxide forming and reacting with the $SO_2$ pollutants.

* * * * *

UNITED STATES PATENT AND TRADEMARK OFFICE
CERTIFICATE OF CORRECTION

PATENT NO. : 5,312,605
DATED : May 17, 1994
INVENTOR(S) : Yiannis A. Levendis, et al.

It is certified that error appears in the above-indentified patent and that said Letters Patent is hereby corrected as shown below:

Column 5, line 27, "salt is," should read --salt is--.

Column 5, line 9, "compounds $SO_2$" should read --compounds including $SO_2$--.

Column 5, line 12, "pollutant" should read --pollutants--.

Column 5, line 40, "pollutant" should read --pollutants--.

Column 6, line 2, "are formed and control $SO_2$ pollutant emissions." should read --forming and reacting with the $SO_2$ pollutants.--.

Column 6, line 36, "pollutant $NO_x$" should read --$NO_x$ pollutants--.

Signed and Sealed this

Thirtieth Day of August, 1994

Attest:

BRUCE LEHMAN

Attesting Officer

Commissioner of Patents and Trademarks